US011969007B2

(12) United States Patent
Thorens

(10) Patent No.: US 11,969,007 B2
(45) **Date of Patent: *Apr. 30, 2024**

(54) AEROSOL GENERATING ARTICLE WITH HEAT DIFFUSER

(71) Applicant: Altria Client Services LLC, Richmond, VA (US)

(72) Inventor: Michel Thorens, Moudon (CH)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/944,619

(22) Filed: Sep. 14, 2022

(65) Prior Publication Data

US 2023/0014502 A1 Jan. 19, 2023

Related U.S. Application Data

(63) Continuation of application No. 16/849,187, filed on Apr. 15, 2020, which is a continuation of application (Continued)

(30) Foreign Application Priority Data

May 31, 2016 (EP) .................................... 16172300

(51) Int. Cl.
*A24D 1/20* (2020.01)
*A24F 40/10* (2020.01)
(Continued)

(52) U.S. Cl.
CPC ................ *A24D 1/20* (2020.01); *A24F 40/40* (2020.01); *A24F 40/465* (2020.01); *A24F 40/53* (2020.01);
(Continued)

(58) Field of Classification Search
CPC .. H05B 1/0227; H05B 3/42; H05B 2203/021; A24F 40/53; A24F 40/40; A24F 40/46
See application file for complete search history.

(56) References Cited

U.S. PATENT DOCUMENTS 1,535,005 A 4/1925 Wilson
3,390,686 A 7/1968 Irby et al.
(Continued)

FOREIGN PATENT DOCUMENTS

BE 823712 A 4/1975
CN 1126426 A 7/1996
(Continued)

OTHER PUBLICATIONS

"Specific Heat Capacity of Metals Tables Chart", 2000 by Engineers Edge. Downloaded on Jan. 26, 2022 from https://www.engineersedge.com/materials/specific_heat_capacity_of_metals_13259.htm (Year: 2000).*

(Continued)

*Primary Examiner* — Thien S Tran
(74) *Attorney, Agent, or Firm* — Harness, Dickey & Pierce, P.L.C.

(57) ABSTRACT

A heated aerosol-generating article for use with an electrically-operated aerosol-generating device includes an outlet end and a distal end. The article may include a heat diffuser at the distal end of the article. The article may include an aerosol-forming substrate between the heat diffuser and the outlet end. The heat diffuser may include a non-combustible porous body configured to absorb heat from an electric heating element such that the heat diffuser is configured to heat air drawn through the aerosol-generating article from the distal end to the outlet end based on the heat absorbed in the porous body. The heated aerosol-generating article may be included in a heated aerosol-generating system that includes an electric heating element configured to generate (Continued)

heat. The heat diffuser may heat air drawn through the aerosol-generating system, based on absorbing heat generated by the electric heating element.

12 Claims, 3 Drawing Sheets

Related U.S. Application Data

No. 15/624,827, filed on Jun. 16, 2017, now Pat. No. 10,660,368, and a continuation of application No. PCT/EP2017/063055, filed on May 30, 2017.

(51) Int. Cl.

| | |
|---|---|
| ***A24F 40/20*** | (2020.01) |
| ***A24F 40/40*** | (2020.01) |
| ***A24F 40/46*** | (2020.01) |
| ***A24F 40/465*** | (2020.01) |
| ***A24F 40/53*** | (2020.01) |
| ***H05B 1/02*** | (2006.01) |
| ***H05B 3/42*** | (2006.01) |

(52) U.S. Cl.

CPC ............ *H05B 1/0227* (2013.01); *H05B 3/42* (2013.01); *A24F 40/10* (2020.01); *A24F 40/20* (2020.01); *A24F 40/46* (2020.01); *H05B 2203/021* (2013.01)

(56) References Cited

U.S. PATENT DOCUMENTS

| | | | | |
|---|---|---|---|---|
| 3,502,084 | A | 3/1970 | Carty | |
| 5,065,776 | A | 11/1991 | Lawson et al. | |
| 5,369,723 | A | 11/1994 | Counts et al. | |
| 5,408,574 | A | 4/1995 | Deevi et al. | |
| 5,783,140 | A | 7/1998 | Kleinfeld | |
| 6,164,287 | A | 12/2000 | White | |
| 10,178,878 | B2 | 1/2019 | Camus et al. | |
| 10,499,690 | B2 | 12/2019 | Thorens | |
| 10,660,368 | B2 | 5/2020 | Thorens | |
| 10,918,135 | B2 | 2/2021 | Thorens | |
| 2008/0092912 | A1 | 4/2008 | Robinson et al. | |
| 2009/0095311 | A1* | 4/2009 | Han | H05B 3/06 131/194 |
| 2010/0059070 | A1 | 3/2010 | Potter et al. | |
| 2011/0005535 | A1 | 1/2011 | Xiu | |
| 2012/0006346 | A1 | 1/2012 | Inagaki | |
| 2012/0042885 | A1 | 2/2012 | Stone et al. | |
| 2013/0255702 | A1 | 10/2013 | Griffith, Jr. et al. | |
| 2014/0202479 | A1 | 7/2014 | Nicholls et al. | |
| 2014/0209112 | A1 | 7/2014 | Awty et al. | |
| 2014/0261486 | A1 | 9/2014 | Potter et al. | |
| 2014/0373856 | A1* | 12/2014 | Zuber | A24F 47/00 131/328 |
| 2015/0013696 | A1 | 1/2015 | Plojoux et al. | |
| 2015/0027477 | A1 | 1/2015 | Yoshino et al. | |
| 2015/0209530 | A1 | 7/2015 | White | |
| 2015/0282525 | A1 | 10/2015 | Plojoux et al. | |
| 2016/0029694 | A1 | 2/2016 | Clements et al. | |
| 2016/0206003 | A1 | 7/2016 | Yamada et al. | |
| 2016/0338402 | A1 | 11/2016 | Buehler et al. | |
| 2017/0095003 | A1 | 4/2017 | Mironov | |
| 2017/0340015 | A1 | 11/2017 | Thorens | |
| 2017/0340016 | A1 | 11/2017 | Thorens | |
| 2017/0340017 | A1 | 11/2017 | Thorens | |
| 2017/0340018 | A1 | 11/2017 | Thorens | |
| 2018/0007972 | A1 | 1/2018 | Thorens | |
| 2018/0295885 | A1 | 10/2018 | Rojo-Calderon et al. | |
| 2019/0098927 | A1 | 4/2019 | Mironov | |
| 2020/0060351 | A1 | 2/2020 | Thorens | |
| 2020/0237008 | A1 | 7/2020 | Thorens | |

FOREIGN PATENT DOCUMENTS

| | | | | |
|---|---|---|---|---|
| CN | 1787753 | A | 6/2006 | |
| CN | 101500443 | A | 8/2009 | |
| CN | 101516425 | A | 8/2009 | |
| CN | 102665459 | A | 9/2012 | |
| CN | 203538389 | U | 4/2014 | |
| CN | 103929988 | A | 7/2014 | |
| CN | 104135881 | A | 11/2014 | |
| CN | 104219972 | A | 12/2014 | |
| CN | 104366697 | A | 2/2015 | |
| CN | 110897203 | A | 3/2020 | |
| DE | 102014116742 | B3 | 7/2015 | |
| EP | 2022349 | A1 | 2/2009 | |
| EP | 2046155 | A1 | 4/2009 | |
| EP | 2316286 | A1 | 5/2011 | |
| EP | 2412396 | A1 | 2/2012 | |
| EP | 2468116 | A1 | 6/2012 | |
| EP | 2807935 | A1 | 12/2014 | |
| EP | 2888963 | A1 | 7/2015 | |
| EP | 3015010 | A1 | 5/2016 | |
| GB | 1262840 | A | 2/1972 | |
| GB | 2513639 | A | 11/2014 | |
| JP | 2006/320286 | A | 11/2006 | |
| JP | 2006-525798 | A | 11/2006 | |
| JP | 2008-523934 | A | 7/2008 | |
| JP | 2009-537119 | A | 10/2009 | |
| JP | 2010-520742 | A | 6/2010 | |
| JP | 2014-000420 | A | 1/2014 | |
| JP | 2014-533513 | A | 12/2014 | |
| JP | 2015-510399 | A | 4/2015 | |
| JP | 2015-524260 | A | 8/2015 | |
| JP | 2019-521650 | A | 8/2019 | |
| JP | 2019-521654 | A | 8/2019 | |
| JP | 2019-521657 | A | 8/2019 | |
| JP | 2019-525726 | A | 9/2019 | |
| KR | 2008-0003908 | A | 1/2008 | |
| KR | 10-2009-0005139 | A | 1/2009 | |
| KR | 20090046820 | A | 5/2009 | |
| KR | 2014-0118983 | A | 10/2014 | |
| KR | 20150143877 | A | 12/2015 | |
| KR | 2016-0058155 | A | 5/2016 | |
| RU | 2297781 | C2 | 4/2007 | |
| RU | 2008106616 | A | 8/2009 | |
| RU | 103062 | U1 | 3/2011 | |
| RU | 2425608 | C2 | 8/2011 | |
| RU | 2509516 | C2 | 3/2014 | |
| RU | 2573948 | C2 | 1/2016 | |
| RU | 2606069 | C2 | 1/2017 | |
| SU | 1837814 | A3 | 8/1993 | |
| WO | WO-2008015441 | A1 | 2/2008 | |
| WO | WO-2013/098405 | A2 | 7/2013 | |
| WO | WO-2013/098409 | A1 | 7/2013 | |
| WO | WO-2013/102609 | A2 | 7/2013 | |
| WO | WO-2013/190036 | A1 | 12/2013 | |
| WO | WO-2014140087 | A1 | 9/2014 | |
| WO | WO-2015/040180 | A2 | 3/2015 | |
| WO | WO-2015/082651 | A1 | 6/2015 | |
| WO | WO-2015/082654 | A1 | 6/2015 | |
| WO | WO-2015101479 | A1 | 7/2015 | |
| WO | WO-2015101651 | A1 | 7/2015 | |
| WO | WO-2015/117705 | A2 | 8/2015 | |
| WO | WO-2015/155289 | A1 | 10/2015 | |
| WO | WO-2015/177247 | A1 | 11/2015 | |
| WO | WO-2015176898 | A1 * | 11/2015 | ........... A24B 15/167 |
| WO | WO-2016-058904 | A1 | 4/2016 | |
| WO | WO-2019/064119 | A1 | 4/2019 | |

OTHER PUBLICATIONS

"Thermal conductivities of the elements", downloaded on Jul. 23, 2019 from https://en.wikipedia.org/wiki/Thermal_conductivites_of_the_elements_(data_page) (Year: 2019).*

Office Action dated Apr. 21, 2023, issued in corresponding U.S. Appl. No. 15/711,261.

Office Action dated Apr. 26, 2023, issued in corresponding U.S. Appl. No. 15/711,257.

(56) References Cited

OTHER PUBLICATIONS

Office Action dated May 9, 2023, issued in corresponding U.S. Appl. No. 15/711,257.
Office Action dated Apr. 13, 2023, issued in corresponding Japanese Application No. 2021-198591.
Notice of Allowance dated Jan. 25, 2023, issued in corresponding Korean Patent Application No. 10-2018-7030456.
Final Office Action dated Nov. 28, 2022, issued in corresponding U.S. Appl. No. 15/711,257.
Notice of Allowance dated Dec. 22, 2022, issued in corresponding U.S. Appl. No. 16/849,187.
Israeli Notice of Allowance dated Nov. 6, 2022, issued in corresponding Israeli Patent Application No. 262309.
Extended European Search Report for European Patent Application 16172300.2 dated Dec. 6, 2016.
International Search Report and Written Opinion dated Jul. 28, 2017 issued in corresponding International Application No. PCT/EP2017/063055.
International Preliminary Report on Patentability dated Dec. 13, 2018 for corresponding International Application No. PCT/EP2017/063055.
"Specific Heat Capacity of Metals Tables Chart", 2000 by Engineers Edge. Downloaded on Jul. 24, 2019 from https:// www.engineersedge.com/materials/specific_heat_capacity_of_metals_13259.htm (Year: 2000).
"Thermal conductivities of the elements (data page)", downloaded on Jul. 23, 2019 from https://en.wikipedia.org/wiki/Thermal_conductivities_of_the_elements_(data_page) (Year: 2019).
Office Action and Search Report dated Jul. 23, 2020 issued in corresponding Russian Application No. 2018141826/03(069706).
Klinov I. Ya "Corrosion of chemical equipment and corrosion-resistant materials, Mechanical Engineering", 1967, pp. 1-469.
Office Action dated Dec. 10, 2020 in Chinese Application No. 201780029109.X.
Office Action for corresponding Russian Application No. 2018141826 dated Dec. 15, 2020.
Alexander Volochko et. al., "Refractory and high-melting-point ceramic materials," Minsk, Belorussian science, 2013, cover sheet and p. 1, 52-56, retrieved on Mar. 5, 2021.
Office Action dated May 31, 2021 issued in corresponding Japanese Patent Application No. 2018-557134.
Chinese Office Action dated Jul. 22, 2021 for corresponding Chinese Application No. 201780029109 and English-language translation thereof.
Office Action dated Jul. 13, 2021 issued in corresponding Israeli Patent Application No. 262319.
Russian Notice of Allowance dated Aug. 12, 2021 for corresponding Russian Application No. 2018141826, and English-language translation thereof.
Japanese Office Action dated Nov. 8, 2021 for corresponding Japanese Application No. 2018-557134, and English-language translation thereof.
Chinese Office Action dated Feb. 28, 2022 for corresponding Chinese Application No. 201780029109.X, and English-language translation thereof.
Wang Hua, "Heating Furnaces", Published Sep. 30, 2015, p. 287.
Korean Office Action dated Jul. 18, 2022 for corresponding Korean Application No. 10-2018-7030456, and English-language translation thereof.
European Search Report for European Application No. EP16172262.4 dated Jan. 13, 2017.
European Search Report for European Application No. EP16172265.7 dated Jan. 17, 2017.
European Search Report for European Application No. EP16172263.2 dated Jan. 17, 2017.
European Search Report for European Application No. EP16172287.1 dated Nov. 16, 2016.
Written Opinion of the International Searching Authority dated May 31, 2016 in related PCT Application No. PCT/EP2017/063061.
International Search Report and Written Opinion dated Aug. 11, 2017, for related PCT Application No. PCT/EP2017/063061.
Notice of Allowance issued Jul. 24, 2019 in related U.S. Appl. No. 15/711,347.
Office Action dated Dec. 30, 2019, issued in co-pending U.S. Appl. No. 15/711,237.
Office Action and search report dated Jun. 22, 2020, issued in corresponding Russian Patent Application No. 2018142136.
Office Action dated Jul. 17, 2020, issued in corresponding U.S. Appl. No. 15/711,237.
Decision to Grant dated Jul. 29, 2020, issued in corresponding Russian Application No. 2018142136/12.
Written Opinion of the International Preliminary Searching Authority dated May 8, 2018, issued in corresponding PCT Application No. PCT/EP2017/063061.
Office Action and search report dated Dec. 22, 2020, issued in corresponding Chinese Patent Application No. 201780029098.5.
Office Action dated Feb. 3, 2021, issued in corresponding U.S. Appl. No. 16/671,930.
Notice of Allowance dated May 11, 2021 in related U.S. Appl. No. 15/711,237.
Notice of Allowance dated May 17, 2021 in related U.S. Appl. No. 16/671,930.
Office Action dated May 24, 2021, issued in corresponding Japanese Patent Application No. 2018-557131.
Office Action dated Oct. 22, 2021, issued in corresponding Chinese Patent Application No. 201780029098.5.
Notice of Allowance dated Jan. 19, 2022, issued in corresponding Chinese Patent Application No. 201780029098.5.
Notice of Deficiencies dated Nov. 29, 2021, issued in corresponding Israeli Patent Application No. 262309.
Office Action dated Jan. 17, 2022, issued in corresponding Japanese Patent Application No. 2018-557131.
Decision to Grant dated May 10, 2022 issued in corresponding Japanese patent application No. 2018-557131.
Office Action dated Jun. 23, 2022, issued in corresponding U.S. Appl. No. 15/711,257.
Office Action dated Jul. 18, 2022, issued in corresponding Korean Patent Application No. 10-2018-7030595.
Office Action dated Oct. 6, 2022, issued in corresponding U.S. Appl. No. 15/711,261.
Notice of Allowance dated Nov. 2, 2022, issued in corresponding U.S. Appl. No. 16/849,187.
Office Action dated Sep. 7, 2022 issued in corresponding Japanese Patent Application No. 2021-198591.
Extended European Search Report for European Application No. 16172295.4 dated Dec. 5, 2016.
International Search Report and Written Opinion dated Aug. 11, 2017 for International App. No. PCT/EP2017/063056.
Extended European Search Report for Application No. 16172294.7 dated Dec. 5, 2016.
U.S. Office Action for corresponding U.S. Appl. No. 15/626,292 dated Dec. 26, 2019.
U.S. Office Action for corresponding U.S. Appl. No. 15/624,826 dated Dec. 26. 2019.
U.S. Office Action for corresponding U.S. Appl. No. 15/624,826 dated May 21, 2020.
U.S. Office Action for corresponding U.S. Appl. No. 15/626,292 dated May 21, 2020.
U.S. Notice of Allowance for corresponding U.S. Appl. No. 15/624,826 dated Jul. 31, 2020.
U.S. Notice of Allowance for corresponding U.S. Appl. No. 15/626,292 dated Jul. 31, 2020.
Written Opinion dated May 8, 2018 for corresponding International Patent App. No. PCT/EP2017/063059.
U.S. Notice of Allowance for corresponding U.S. Appl. No. 15/626,292 dated Nov. 12, 2020.
U.S. Office Action for U.S. Appl. No. 17/149,255, dated Oct. 5, 2022.
U.S. Office Action for U.S. Appl. No. 17/165,201, dated Oct. 17, 2022.
U.S. Office Action for U.S. Appl. No. 17/165,201, dated Mar. 7, 2023.

(56) References Cited

OTHER PUBLICATIONS

U.S. Office Action for U.S. Appl. No. 17/149,255, dated Mar. 1, 2023.
Notice of Allowance dated Apr. 5, 2023, issued in corresponding U.S. Appl. No. 17/149,255.
Notice of Allowance dated Jan. 25, 2023, issued in corresponding Korean Patent Application No. 10-2018-7030595.
Office Action dated Jun. 27, 2023, issued in corresponding U.S. Appl. No. 17/165,201.
Office Action dated Jul. 7, 2023, issued in corresponding U.S. Appl. No. 16/849,187.
Office Action dated Sep. 22, 2023, issued in corresponding U.S. Appl. No. 15/711,261.
Office Action dated Jul. 14, 2023, issued in corresponding U.S. Appl. No. 17/149,255.
U.S. Appl. No. 15/711,261, filed Sep. 21, 2017.
U.S. Appl. No. 17/412,738, filed Aug. 26, 2021.
U.S. Appl. No. 17/459,265, filed Aug. 27, 2021.
U.S. Appl. No. 15/711,257, filed Sep. 21, 2017.
U.S. Appl. No. 16/849,187, filed Apr. 15, 2020.
U.S. Appl. No. 17/165,201, filed Feb. 2, 2021.
U.S. Appl. No. 17/149,255, filed Jan. 14, 2021.
Canadian Office Action, dated Aug. 23, 2023, issued in corresponding Canadian Patent Application No. 3,014,148.
Canadian Office Action, dated Sep. 30, 2023, issued in corresponding Canadian Patent Application No. 3,016,274.
Russian Notice of Allowance and English translation thereof dated Jul. 15, 2020 for App. No. 2018142132.
Russian Decision to Grant and Search Report and English translation thereof dated Sep. 25, 2020 for App. No. 2018142472.
Chinese Office Action and English translation thereof dated Feb. 3, 2021 for Chinese App. No. 201780030318.6.
Chinese Office Action and English translation thereof dated Feb. 20, 2021 for Chinese App. No. 201780028191.4.
Japanese Office Action and English translation thereof dated May 13, 2021 for Japanese App. No. 2018-557132.
Japanese Office Action and English translation thereof dated May 31, 2021 for Japanese App. No. 2018-559713.
Chinese Office Action and English translation thereof dated Sep. 17, 2021 for Chinese App. No. 201780028191.4.
Japanese Decision to Grant and English translation thereof dated Dec. 6, 2021 for Japanese App. No. 2018-557132.
Chinese Notification to Grant and English translation thereof dated Dec. 15, 2021 for Chinese App. No. 201780030318.6.
Japanese Decision to Grant and English translation thereof dated Feb. 7, 2022 for Japanese App. No. 2018-559713.
Korean Office Action and English translation thereof dated Jul. 18, 2022 for Korean App. No. 10-2018-7030600.
Korean Notice of Allowance for corresponding Application No. 10-2018-7031323, dated Jan. 25, 2023, with English Translation included herewith.
Korean Notice of Allowance for corresponding Application No. 10-2018-7030600, dated Jan. 25, 2023, with English translation included herewith.
Office Action dated Jul. 20, 2023, issued in corresponding Canadian Patent Application No. 3,014,149.
Canadian Office Action dated Oct. 20, 2023 for corresponding Canadian Patent Application No. 3,014,136.
Notice of Allowance, dated Dec. 13, 2023, issued in U.S. Appl. No. 16/849,187.
Office Action issued Nov. 24, 2023 in U.S. Appl. No. 17/165,201.
Office Action issued Dec. 8, 2023 in U.S. Appl. No. 17/149,255.
Office Action issued Dec. 19, 2023 in U.S. Appl. No. 17/412,738.
Korean Office Action, dated Dec. 12, 2023, issued in Korean Patent Application No. 10-2023-7013274.
Notice of Allowance, dated Feb. 21, 2024, issued in U.S. Appl. No. 17/149,255.
Notice of Allowance, dated Feb. 7, 2024, issued in U.S. Appl. No. 17/165,201.
Notice of Allowance, dated Feb. 9, 2024, issued in U.S. Appl. No. 15/711,257.
Final Office Action, dated Mar. 15, 2024, issued in U.S. Appl. No. 15/711,261.

* cited by examiner

AEROSOL GENERATING ARTICLE WITH HEAT DIFFUSER

CROSS-REFERENCE TO RELATED APPLICATIONS

This application is a continuation of U.S. application Ser. No. 16/849,187, filed on Apr. 15, 2020, which is a continuation of U.S. application Ser. No. 15/624,827, filed on Jun. 16, 2017, which is a continuation of, and claims priority to, international application no. PCT/EP2017/063055, filed on May 30, 2017, which claims priority to European Patent Application No. 16172300.2, filed on May 31, 2016, the entire contents of each of which are incorporated herein by reference.

BACKGROUND

Field

One or more example embodiments relate to heated aerosol-generating articles for use with aerosol-generating devices, and to aerosol-generating systems comprising an aerosol-generating article and an aerosol-generating device.

Description of Related Art

Some types of aerosol-generating system include electrically operated aerosol-generating systems. Known handheld electrically operated aerosol-generating systems typically comprise an aerosol-generating device comprising a battery, control electronics and an electric heater for heating an aerosol-generating article designed specifically for use with the aerosol-generating device. In some examples, the aerosol-generating article comprises an aerosol-forming substrate, such as a tobacco rod or a tobacco plug, and the heater contained within the aerosol-generating device is inserted into or around the aerosol-forming substrate when the aerosol-generating article is inserted into the aerosol-generating device.

In existing systems, it may be difficult to evenly heat the aerosol-forming substrate with the electric heater. This may lead to some areas of the aerosol-forming substrate being over-heated and may lead to some areas of the aerosol-forming substrate being under-heated. Both may make it difficult to maintain consistent aerosol characteristics. This may be a particular issue with aerosol-generating articles in which the aerosol-forming substrate is a liquid aerosol-forming substrate, since depletion of the aerosol-forming substrate may cause one or more parts of the aerosol-generating article to overheat.

It would be desirable to provide an aerosol-generating article that facilitates even heating of an aerosol-forming substrate.

SUMMARY

According to some example embodiments, a heated aerosol-generating article may have an outlet end and a distal end. The heated aerosol-generating article may include a heat diffuser at the distal end of the heated aerosol-generating article, and an aerosol-forming substrate between the heat diffuser and the outlet end of the heated aerosol-generating article. The heat diffuser may include a non-combustible porous body configured to absorb heat, such that the heat diffuser is configured to heat air drawn through the aerosol-generating article from the distal end to the outlet end.

The porous body may include a heat storage material.

The porous body may at least partially comprise a material having a specific heat capacity, at a temperature of 25 degrees Celsius, of at least 0.5 J/g·K, 0.7 J/g·K, and/or 0.8 J/g·K.

The porous body may at least partially comprise a material of glass fiber, glass mat, ceramic, silica, alumina, carbon, and/or a mineral.

The porous body may be thermally conductive.

The porous body may at least partially comprise a material having a thermal conductivity, at a temperature of 23 degrees Celsius and a relative humidity of 50%, of at least 40 W/m·K, 100 W/m·K, 150 W/m·K, and/or 200 W/m·K.

The porous body may at least partially comprise a thermally conductive material of aluminum, copper, zinc, steel, silver, and/or a thermally conductive polymer.

The porous body may be configured to be penetrated by an electric heating element of an aerosol-generating device, based on the heated aerosol-generating article being coupled to the aerosol-generating device.

The porous body may define a cavity configured to receive the electric heating element.

The heated aerosol-generating article may further include an electric heating element coupled to the heat diffuser.

The electric heating element may include a susceptor embedded in the porous body.

The aerosol-forming substrate may be a liquid aerosol-forming substrate. The heated aerosol-generating article may further include a frangible capsule containing the liquid aerosol-forming substrate and a porous carrier material between the heat diffuser and the outlet end. The porous carrier material may be configured to absorb the liquid aerosol-forming substrate.

The frangible capsule may be located within the porous carrier material.

The heat diffuser may be spaced apart in a longitudinal direction of the article from the aerosol-forming substrate and/or a porous carrier material.

According to some example embodiments, a heated aerosol-generating system may include an electrically operated aerosol-generating device and the heated aerosol-generating article. The electrically operated aerosol-generating device may include an electric heating element and a housing, the housing defining a cavity. The heated aerosol-generating article may be received in the cavity such that the heat diffuser is penetrated by the electric heating element.

According to some example embodiments, a heated aerosol-generating system may include an electric heating element configured to generate heat and a heat diffuser. The heat diffuser may define a cavity in which the electric heating element is located. The heat diffuser may include a non-combustible porous body configured to absorb heat, such that the heat diffuser is configured to heat air drawn through the aerosol-generating system, based on absorbing heat generated by the electric heating element.

The porous body may at least partially comprise a material having a specific heat capacity, at a temperature of 25 degrees Celsius, of at least 0.5 J/g·K, 0.7 J/g·K, and/or 0.8 J/g·K.

The porous body may at least partially comprise a material having a thermal conductivity, at a temperature of 23 degrees Celsius and a relative humidity of 50%, of at least 40 W/m·K, 100 W/m·K, 150 W/m·K, and/or 200 W/m·K.

The porous body may at least partially comprise a thermally conductive material of aluminum, copper, zinc, steel, silver, and/or a thermally conductive polymer.

BRIEF DESCRIPTION OF THE DRAWINGS

Example embodiments of the inventive concepts will now be described, by way of example only, with reference to the accompanying drawings, in which.

DETAILED DESCRIPTION

Figure 1:
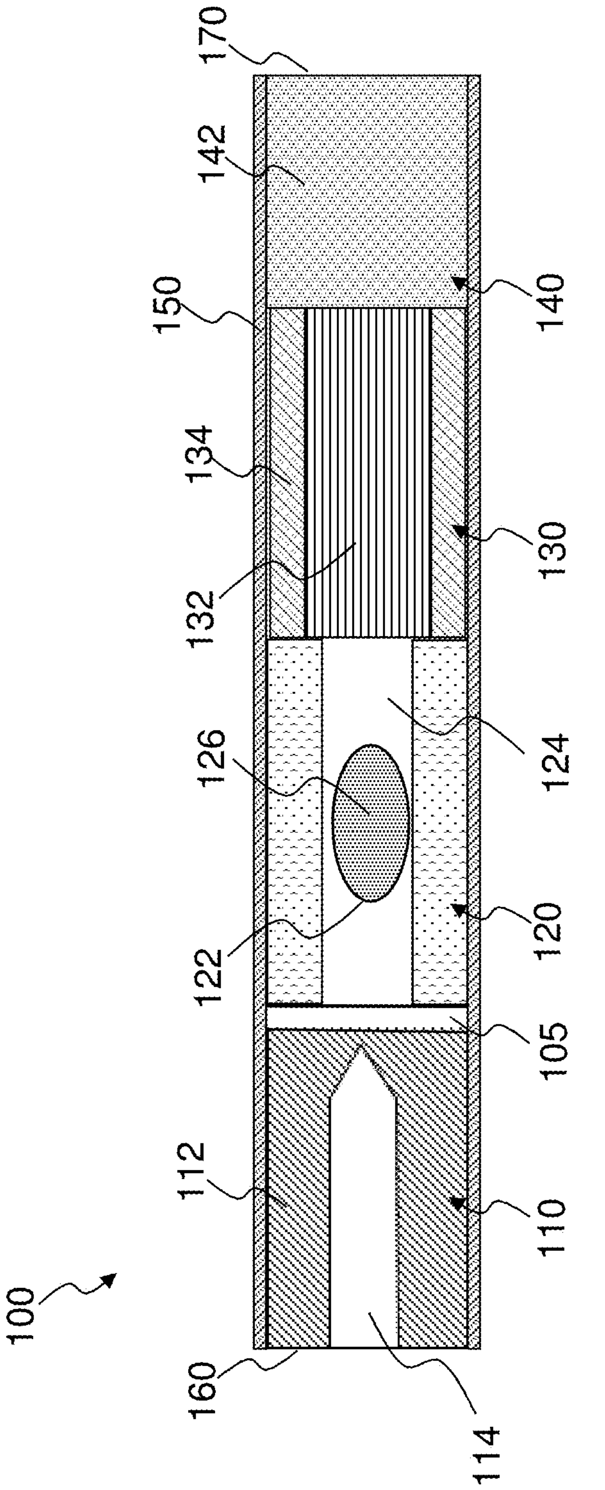
FIG. 1 shows a schematic longitudinal cross-section of an aerosol-generating article according to some example embodiments.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises,” “comprising,” “includes,” and/or “including,” when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being “on”, “connected to” or “coupled to” another element or layer, it can be directly on, connected or coupled to the other element or layer or intervening elements or layers may be present. In contrast, when an element is referred to as being “directly on”, “directly connected to” or “directly coupled to” another element or layer, there are no intervening elements or layers present. As used herein, the term “and/or” includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as “beneath”, “below”, “lower”, “above”, “upper”, and the like, may be used herein for ease of description to describe one element or feature’s relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as “processing” or “computing” or “calculating” or “determining” or “displaying” or the like, refer to the action and processes of a computer system, or similar electronic computing device, that manipulates and transforms data represented as physical, electronic quantities within the computer system’s registers and memories into other data similarly represented as physical quantities within the computer system memories or registers or other such information storage, transmission or display devices.

As disclosed herein, the term “storage medium”, “computer readable storage medium” or “non-transitory computer readable storage medium,” may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term “computer-readable medium” may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer (s).

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

According to some example embodiments, an aerosol-generating article, for use with ("configured to be used with") an electrically-operated aerosol-generating device may include an outlet end and a distal end upstream from the outlet end, the article comprising: a heat diffuser at the distal end of the article; and an aerosol-forming substrate downstream of the heat diffuser, wherein the heat diffuser comprises a non-combustible porous body for absorbing heat ("configured to absorb heat") from an electric heating element such that, in use, the heat diffuser is configured to heat air drawn through the aerosol-generating article from the distal end to the outlet end, based on the drawn air being heated by the heat absorbed in the porous body.

Advantageously, in use, the heat diffuser absorbs heat from a heating element and transfers it to air drawn through the heat diffuser so that the air can heat the aerosol-forming substrate downstream of the heat diffuser primarily by convection. This may provide more even heating of the aerosol-forming substrate relative to existing systems in which the aerosol-forming substrate is heated primarily by conduction from the heating element. For example, it may mitigate or prevent areas of local high temperature, or "hot spots", from occurring in the aerosol-forming substrate that may otherwise be caused by conductive heating. This may be of particular benefit when the aerosol-forming substrate is a liquid aerosol-forming substrate, since the heat diffuser may help to mitigate or prevent overheating that may otherwise result from depletion of the aerosol-forming substrate. For example, where the aerosol-forming substrate comprises a liquid aerosol-forming substrate held in a liquid retention medium, the heat diffuser may help to mitigate or prevent overheating of the aerosol-forming substrate or the liquid retention medium, even when it is dry.

Additionally, by being part of the aerosol-generating article, the heat diffuser may be easily disposed of along with the aerosol-generating article. This may be advantageous over systems in which a heat diffuser is separate from the aerosol-generating article, since the heat diffuser is replaced with a new one each time the article is replaced, thus mitigating or preventing over use.

As used herein, the term "heated aerosol-generating article" refers to an article comprising an aerosol-generating substrate that, when heated, releases volatile compounds that can form an aerosol.

The aerosol-generating article may be configured to be removably coupled to an aerosol-generating device. The article may be disposable or reusable.

As used herein, the term "porous" is intended to encompass materials that are inherently porous as well as substantially non-porous materials that are made porous or permeable through the provision of a plurality of holes. The porous body may be formed from ("may at least partially comprise") a plug of porous material, for example a ceramic or metal foam. In some example embodiments, the porous body may be formed from a plurality of solid elements between which a plurality of apertures are provided. For example, the porous body may comprise a bundle of fibers, or a lattice of interconnected filaments. The porous material may include pores of a sufficient size that air can be drawn through the porous body through the pores. For example, the pores in the porous body may have an average transverse dimension of less than about 3.0 mm, less than about 1.0 mm, and/or less than about 0.5 mm. Alternatively or in addition, the pores may have an average transverse dimension that is greater than about 0.01 mm. For example, the pores may have an average transverse dimension that is between about 0.01 mm and about 3.0 mm, between about 0.01 mm and about 1.0 mm, and/or between about 0.01 mm and about 0.5 mm.

As used herein, the term "pores" relates to regions of a porous article that are devoid of material. For example, a transverse area of porous body will comprise portions of the material forming the body and portions that are voids between the portions of material.

The average transverse dimension of the pores is calculated by taking the average of the smallest transverse dimension of each of the pores. The pore sizes may be substantially constant along the length of the porous body. In some example embodiments, the pore sizes may vary along the length of the porous body.

As used herein, the term "transverse dimension" refers to a dimension that is in a direction which is substantially perpendicular to the longitudinal direction of the porous body or of the aerosol-generating article.

The porosity distribution of the porous body may be substantially uniform (e.g., uniform within manufacturing tolerances and/or material tolerances). That is, the pores within the porous body may be distributed substantially evenly (e.g., evenly within manufacturing tolerances and/or material tolerances) over the transverse area of the porous body. The porosity distribution may differ across the transverse area of the porous body. That is, the local porosity in one or more sub-areas of the transverse area may be greater than the local porosity in one or more other sub-areas of the transverse area. For example, the local porosity in one or more sub-areas of the transverse area may be between 5 percent and 80 percent greater than the local porosity in one or more other sub-areas of the transverse area.

As used herein, the term "transverse area" relates to an area of the porous body that is in a plane generally perpendicular to the longitudinal dimension of the porous body. For example, the porous body may be a rod and the transverse area may be a cross-section of the rod taken at any length along the rod, or the transverse area may be an end face of the rod.

As used herein, the term "porosity" refers to the volume fraction of void space in a porous article. As used herein, the term "local porosity" refers to the fraction of pores within a sub-area of the porous body.

By varying the porosity distribution, air flow through the porous body may be altered as desired, for example to provide improved aerosol characteristics. For example, this porosity distribution may be varied according to the air flow characteristics of an aerosol-generating system, or the temperature profile of a heating element, with which the heat diffuser is intended for use.

In some examples, the local porosity may be lower towards a center portion of the porous body. With this arrangement, the air flow through the center portion of the porous body is decreased relative to the periphery of the porous body. This may be advantageous depending on the temperature profile of the heating element or on the airflow characteristics of the aerosol-generating system with which the heat diffuser is intended for use. For example, this arrangement may be of particular benefit when used with an internal heating element positioned in use towards a central portion of the heat diffuser, since it may allow for increased heat transfer from the heating element to the porous body.

In other examples, the local porosity may be greater towards a center portion of the porous body. This arrangement may enable increased air flow through the center of the porous body and may be advantageous depending on the temperature profile of the heating element or on the airflow characteristics of the aerosol-generating system with which the heat diffuser is intended for use. For example, this arrangement may be of particular benefit when used with an external heating element positioned in use around the periphery of the heat diffuser, since it may allow for increased heat transfer from the heating element to the porous body.

The porous body may be formed from a heat storage material.

As used herein, the term "heat storage material" refers to a material having a high heat capacity. With this arrangement, the porous body may act as a heat reservoir, allowing the heat diffuser to absorb and store heat from the heating element and to subsequently release the heat over time to the aerosol-forming substrate, via air drawn through the porous body.

Where the porous body is formed from a heat storage material, the porous body may be formed from ("may at least partially comprise") a material having a specific heat capacity of at least 0.5 J/g·K, at least 0.7 J/g·K, and/or at least 0.8 J/g·K at a temperature of 25 degrees Celsius and constant pressure. As the specific heat capacity of a material is effectively a measure of the material's ability to store thermal energy, forming the porous body from a material having a high heat capacity may allow ("enable") the porous body to provide a large heat reservoir for heating air drawn through the heat diffuser without substantially increasing the weight of an aerosol-generating system with which the heat diffuser is intended for use.

The porous body may be formed from any suitable material or materials. Where the porous body is formed from a heat storage material, suitable materials include, but are not limited to, glass fiber, glass mat, ceramic, silica, alumina, carbon, and minerals, or any combination thereof.

The heat storage material may be thermally insulating. As used herein, the term "thermally insulating" refers to a material having a thermal conductivity of less than 100 W/m·K, less than 40 W/m·K, and/or less than 10 W/m·K at a temperature of 23 degrees Celsius and a relative humidity of 50%. This may result in a heat diffuser with a higher thermal inertia relative to thermally conductive heat diffusers to reduce variations in the temperature of air drawn through the porous body caused by temperature fluctuations in the heating element. This may result in more consistent aerosol characteristics.

The porous body may be thermally conductive. As used herein, the term "thermally conductive" refers to a material having a thermal conductivity of at least 10 W/m·K, at least 40 W/m·K, and/or at least 100 W/m·K at 23 degrees Celsius and a relative humidity of 50%. Where the porous body is thermally conductive, the porous body may be formed from ("may at least partially comprise") a material having a thermal conductivity of at least 40 W/m·K, at least 100 W/m·K, at least 150 W/m·K, and/or at least 200 W/m·K at 23 degrees Celsius and a relative humidity of 50%.

Advantageously, this may reduce the thermal inertia of the heat diffuser and allow the temperature of the heat diffuser to quickly adjust to changes in the temperature of the heating element, for example where the heating element is heated according to a heating regime which changes over time, while still allowing the air drawn through the porous body to be evenly heated. Further, by having a high thermal conductivity, the thermal resistance through the porous body will be lower. This may allow the temperature of portions of the porous body which are remote from the heating element in use to be at a similarly high temperature as the portions of the porous body which are closest to the heating element in use. This may provide for particularly efficient heating of air drawn through the porous body.

Where the porous body is thermally conductive, the porous body may be formed from ("at least partially comprises") a material having a thermal conductivity of at least 40 W/m·K, at least 100 W/m·K, at least 150 W/m·K, and/or at least 200 W/m·K at 23 degrees Celsius and a relative humidity of 50%.

Where the porous body is thermally conductive, suitable thermally conductive materials include, but are not limited to, aluminum, copper, zinc, steel, silver, thermally conductive polymers, or any combination or alloy thereof.

In some example embodiments, the porous body is formed from ("at least partially comprises") a heat storage material which is also thermally conductive, such as aluminum.

As porous bodies have a high surface-area-to-volume ratio, the heat diffuser may allow quick and efficient heating of air drawn through the porous body. This may allow for homogenous heating of air drawn through the porous body and, consequently, more even heating of an aerosol-forming substrate downstream of the heat diffuser (e.g., between the heat diffuser and the outlet end).

In some example embodiments, the porous body has a surface area-to-volume ratio of at least 20 to 1, at least 100 to 1, and/or at least 500 to 1. Advantageously, this may provide a compact heat diffuser while allowing for particularly efficient transfer of thermal energy from the heating element to air drawn through the porous body. This may lead to quicker, and more homogenous heating of air drawn through the porous body and, consequently, more even heating of an aerosol-forming substrate downstream of the heat diffuser (e.g., between the heat diffuser and the outlet end) relative to porous bodies having lower surface area to volume ratios.

In some example embodiments, the porous body has a high specific surface area. This is a measure of the total surface area of a body per unit of mass. Advantageously, this may provide a low mass heat diffuser with a large surface area for efficient transfer of thermal energy from the heating element to air drawn through the porous body. For example, the porous body may have a specific surface area of at least 0.01 $m^2$ per gram, at least 0.05 $m^2$ per gram, at least 0.1 $m^2$ per gram, and/or at least 0.5 $m^2$ per gram.

The porous body may have an open cell porosity of between about 60 percent to about 90 percent void volume to material volume.

In some example embodiments, the porous body has a low resistance to draw. That is, the porous body may offer a low resistance to the passage of air through the heat diffuser. In such examples, the porous body does not substantially affect (e.g., does not affect within manufacturing tolerances and/or material tolerances) the resistance to draw of an aerosol-generating system with which the heat diffuser is intended for use. In some example embodiments, the resistance to draw (RTD) of the porous body is between about 10 to 130 mm $H_2O$, and/or between about 40 to 100 mm $H_2O$. The RTD of a specimen refers to the static pressure difference between the two ends of the specimen when it is traversed by an air flow under steady conditions in which the volumetric flow is 17.5 milliliters per second at the output end. The RTD of a specimen can be measured using the method set out in ISO Standard 6565:2002 with any ventilation blocked.

The porous body may be configured to be penetrated by an electric heating element forming part of an aerosol-generating device when the heat diffuser is coupled to the aerosol-generating device. The term "penetrated" is used to mean that the heating element at least partially extends into the porous body. Thus, the heating element may be sheathed within the porous body. With this arrangement, by the act of penetration, the heating element is brought into close proximity to, or contact with, the porous body. This may increase heat transfer between the heating element and the porous body and, consequently, to air drawn through the porous body relative to examples in which the porous body is not penetrated by the heating element.

The heating element may conveniently be shaped as a needle, pin, rod, or blade that may be inserted into the heat diffuser. The aerosol-generating device may comprise more than one heating element and in this description reference to a heating element means one or more heating elements.

The porous body may define a cavity or hole for receiving the electric heating element when the heat diffuser is coupled to the aerosol-generating device.

In any of the above embodiments, the porous body may be rigid.

The porous body may be pierceable by the heating element when the heat diffuser is coupled to the aerosol-generating device. For example, the porous body may comprise a foam, such as a polymer, metal or ceramic foam, that is pierceable by the heating element.

In some example embodiments, the electric heating element may be provided as part of an aerosol-generating device with which the heat diffuser is intended for use, or as part of the aerosol-generating article, for example as part of the heat diffuser.

In some example embodiments, the aerosol-generating article may comprise an electric heating element thermally coupled to the porous body. In such example embodiments, the porous body is arranged to absorb heat from the heating element and transfer it to air drawn through the porous body. With this arrangement, the heating element can be easily replaced by replacing the article.

The electric heating element may comprise one or more external heating elements, one or more internal heating elements, or one or more external heating elements and one or more internal heating elements. As used herein, the term "external heating element" refers to a heating element that is positioned outside of the article when in use. As used herein, the term "internal heating element" refers to a heating element that is positioned at least partially within the article when in use.

The one or more external heating elements may comprise an array of external heating elements arranged around the periphery of the heat diffuser, for example on the outer surface of the porous body. In certain examples, the external heating elements extend along the longitudinal direction of the article. With this arrangement, the heating elements may extend along the same direction in which the article is inserted into and removed from a cavity in an aerosol-generating device. This may reduce interference between the heating elements and the aerosol-generating device relative to devices in which the heating elements are not aligned with the length of the article. In some example embodiments, the external heating elements extend along the length direction of the article and are spaced apart in the circumferential direction. Where the heating element comprises one or more internal heating elements, the one or more internal heating elements may comprise any suitable number ("quantity") of heating elements. For example, the heating element may comprise a single internal heating element. The single internal heating element may extend along the longitudinal direction of the heat diffuser.

Where the electric heating element forms part of the heat diffuser, the heat diffuser may further comprise one or more electrical contacts by which the electric heating element is connectable to a power source, for example a power source in the aerosol-generating device.

The electric heating element may be an electrically resistive heating element.

The electric heating element may comprise a susceptor in thermal contact with the porous body. The electric heating element may be a susceptor forming part of the heat diffuser. The susceptor may be embedded in the porous body.

As used herein, the term 'susceptor' refers to a material that can convert electromagnetic energy into heat. When located within a fluctuating electromagnetic field, eddy currents induced in the susceptor cause heating of the susceptor. As the susceptor is in thermal contact with the heat diffuser, the heat diffuser is heated by the susceptor.

In some example embodiments, the article is configured to engage with an electrically-operated aerosol-generating device comprising an induction heating source. The induction heating source, or inductor, generates the fluctuating electromagnetic field for heating a susceptor located within the fluctuating electromagnetic field. In use, the article engages with the aerosol-generating device such that the susceptor is located within the fluctuating electromagnetic field generated by the inductor.

The susceptor may be in the form of a pin, rod, or blade. The susceptor may have a length of between 5 mm and 15 mm, for example between 6 mm and 12 mm, or between 8 mm and 10 mm. The susceptor may have a width of between 1 mm and 5 mm and may have a thickness of between 0.01 mm and 2 mm. for example between 0.5 mm and 2 mm. The susceptor may have a thickness of between 10 micrometers and 500 micrometers, and/or between 10 and 100 micrometers. If the susceptor has a constant cross-section, for example a circular cross-section, it may have a width or diameter of between 1 mm and 5 mm.

The susceptor may be formed from ("may at least partially comprise") any material that can be inductively heated to a temperature sufficient to generate an aerosol from the aerosol-forming substrate. A susceptor may comprise a metal or carbon. A susceptor may comprise a ferromagnetic material, for example ferritic iron, or a ferromagnetic steel or stainless steel. A susceptor may be, or comprise, aluminum. Susceptors may be formed from 400 series stainless steels, for example grade 410, or grade 420, or grade 430 stainless steel. Different materials will dissipate different amounts of energy when positioned within electromagnetic fields having similar values of frequency and field strength. Thus, parameters of the susceptor such as material type, length, width, and thickness may all be altered to provide a desired power dissipation within a known electromagnetic field.

Susceptors may be heated to a temperature in excess of 250 degrees Centigrade. Susceptors may comprise a non-metallic core with a metal layer disposed on the non-metallic core, for example metallic tracks formed on a surface of a ceramic core.

A susceptor may have a protective external layer, for example a protective ceramic layer or protective glass layer encapsulating the susceptor. The susceptor may comprise a protective coating formed by a glass, a ceramic, or an inert metal, formed over a core of the susceptor.

The heat diffuser may contain a single susceptor. In some example embodiments, the heat diffuser may comprise more than one susceptor.

The aerosol-forming substrate may be a solid aerosol-forming substrate. In some example embodiments, the aerosol-forming substrate may comprise both solid and liquid elements. The aerosol-forming substrate may comprise tobacco. The aerosol-forming substrate may comprise a tobacco-containing material containing volatile tobacco flavor compounds which are released from the substrate upon heating. The aerosol-forming substrate may comprise a non-tobacco material. The aerosol-forming substrate may comprise tobacco-containing material and non-tobacco containing material.

The aerosol-forming substrate may further comprise an aerosol former that facilitates the formation of a dense and stable aerosol. Examples of suitable aerosol formers are glycerine and propylene glycol.

The aerosol-forming substrate may comprise a solid aerosol-forming substrate. The aerosol-forming substrate may comprise a tobacco-containing material containing volatile tobacco flavor compounds which are released from the substrate upon heating. The aerosol-forming substrate may comprise a non-tobacco material.

The aerosol-forming substrate may include at least one aerosol-former. As used herein, the term 'aerosol former' is used to describe any suitable known compound or mixture of compounds that, in use, facilitates formation of an aerosol. Suitable aerosol formers are substantially resistant to thermal degradation at the operating temperature of the aerosol-generating article. Examples of suitable aerosol formers are glycerine and propylene glycol. Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may include polyhydric alcohols or mixtures thereof, such as propylene glycol, triethylene glycol, 1,3-butanediol and/or glycerine. The aerosol-forming substrate may comprise a single aerosol former. In some example embodiments, the aerosol-forming substrate may comprise a combination of two or more aerosol formers. The aerosol-forming substrate may have an aerosol former content of greater than 5 percent on a dry weight basis. The aerosol-forming substrate may have an aerosol former content of between approximately 5 percent and approximately 30 percent on a dry weight basis. The aerosol-forming substrate may have an aerosol former content of approximately 20 percent on a dry weight basis.

The aerosol-forming substrate may comprise a liquid aerosol-forming substrate. The liquid aerosol-forming substrate may comprise a nicotine solution. The liquid aerosol-forming substrate may comprise a tobacco-containing material comprising volatile tobacco flavor compounds which are released from the liquid upon heating. The liquid aerosol-forming substrate may comprise a non-tobacco material. The liquid aerosol-forming substrate may include water, solvents, ethanol, plant extracts and natural or artificial flavors. The liquid aerosol-forming substrate may further comprise an aerosol former.

As used herein, the term "liquid aerosol-forming substrate" refers to an aerosol-forming substrate that is in a liquid rather than a solid form. A liquid aerosol-forming substrate may be at least partially absorbed by a liquid retention medium. A liquid-aerosol-forming substrate includes an aerosol-forming substrate in the form of a gel.

In some example embodiments, the aerosol-generating article comprises a liquid aerosol-forming substrate and a liquid retention medium for retaining the liquid aerosol-forming substrate.

As used herein, the term "liquid retention medium" refers to an element that is capable of releasably retaining a liquid aerosol-forming substrate. The liquid retention medium may be, or may comprise, a porous or fibrous material that absorbs or otherwise retains a liquid aerosol-forming substrate that it is brought into contact with while allowing the liquid aerosol-forming substrate to be released by vaporization.

The liquid retention medium may comprise an absorbent material, for example an absorbent polymeric material. Examples of suitable liquid retention materials include fibrous polymers and porous polymers such as open-cell foams. The liquid retention medium may comprise a fibrous cellulose acetate or a fibrous cellulose polymer. The liquid retention medium may comprise a porous polypropylene material. Suitable materials capable of retaining a liquid will be known to the skilled person.

The liquid retention medium is either located within an air-flow path through the heated aerosol-generating article or defines at least a portion of an air-flow path through the aerosol-generating article. One or more holes defined through the liquid retention medium may define a portion of the air-flow path through the heated aerosol-generating article between the distal end of the article and the outlet end of the article.

The liquid retention medium may be in the form of a tube having a central lumen. Walls of the tube would then be formed from, or comprise, a suitable liquid-retention material.

The liquid aerosol-forming substrate may be incorporated into the liquid retention medium immediately prior to use. For example, a dose of liquid aerosol-forming substrate may be injected into the liquid retention medium immediately prior to use.

Articles according to some example embodiments may comprise a liquid aerosol-forming substrate contained within a frangible capsule. The frangible capsule may be located between the distal end and the mid-point of the article.

As used herein, the term "frangible capsule" refers to a capsule that is capable of containing a liquid aerosol-forming substrate and releasing the liquid aerosol-forming substrate when broken or ruptured. The frangible capsule may be formed from, or comprise, a brittle material that is easily broken to release its liquid aerosol-forming substrate contents. For example the capsule may be broken by external force such as finger pressure, or by contact with a piercing or rupturing element.

The frangible capsule may be spheroid, for example spherical or ovoid, having a maximum dimension of between 2 mm and 8 mm, for example between 4 mm and 6 mm. The frangible capsule may contain a volume of between 20 and 300 microliters, for example between 30 and 200 microliters. Such a range may provide between 10 and 150 instances of aerosol.

The frangible capsule may have a brittle shell, or may be shaped to facilitate rupture when subjected to external force. The frangible capsule may be configured to be ruptured by application of external force. For example, the frangible capsules may be configured to rupture at a specific defined external force, thereby releasing the liquid-aerosol-forming substrate. The frangible capsule may be configured with a weakened or brittle portion of its shell to facilitate rupture. The frangible capsule may be configured to be engaged with a piercing element to break the capsule and release the liquid aerosol-forming substrate. The frangible capsule may have a burst strength of between about 0.5 and 2.5 kilograms force (kgf), for example between 1.0 and 2.0 kgf.

The shell of the frangible capsule may comprise a suitable polymeric material, for example a gelatin based material. The shell of the capsule may comprise a cellulose material or a starch material.

The liquid aerosol-forming substrate may be releasably contained within the frangible capsule and the article may further comprise a liquid retention medium located in proximity to the frangible capsule for retaining the liquid aerosol-forming substrate within the article after its release from the frangible capsule.

The liquid retention medium may be capable of absorbing between 105% and 110% of the total volume of liquid contained within the frangible capsule. This helps to mitigate or prevent leakage of liquid aerosol-forming substrate from the article after the frangible capsule has been broken to release its contents. The liquid retention medium may be between 90% and 95% saturated after release of the liquid aerosol-forming substrate from the frangible capsule.

In some example embodiments, the aerosol-forming substrate is a liquid aerosol-forming substrate and the article further comprises a frangible capsule containing the liquid aerosol-forming substrate, and a liquid retention medium downstream of the heat diffuser and arranged to absorb the liquid aerosol-forming substrate when the frangible capsule is broken.

The frangible capsule may be located within the porous carrier material. The porous carrier material may be provided in the form of a liquid retention tube and the frangible capsule is located within the lumen of the tube.

The frangible capsule may be located adjacent to the liquid retention medium within the article such that the liquid-aerosol-forming substrate released from the frangible capsule can contact and be retained by the liquid retention medium. The frangible capsule may be located within the liquid retention medium. For example, the liquid retention medium may comprise a plug of material in which the capsule is embedded. The article may comprise a tubular liquid retention medium and the frangible capsule containing the liquid aerosol-forming substrate may be located within the lumen of the tubular liquid retention medium.

Where the aerosol-forming substrate is a solid aerosol-forming substrate, the solid aerosol-forming substrate may be immediately downstream of the heat diffuser. For example, the solid aerosol-forming substrate may abut the heat diffuser. In some example embodiments, the solid aerosol-forming substrate may be spaced apart in the longitudinal direction from the heat diffuser.

In some example embodiments, the aerosol-forming substrate is a liquid aerosol-forming substrate and the article further comprises a liquid retention medium for retaining the liquid aerosol-forming substrate. In some example embodiments, the liquid retention medium may be immediately downstream of the heat diffuser (e.g., between the heat diffuser and the outlet end). For example, the liquid retention medium may abut the heat diffuser. In some example embodiments, the liquid retention medium may be spaced apart in the longitudinal direction from the heat diffuser.

In some example embodiments, the aerosol-forming substrate is a liquid aerosol-forming substrate and the article further comprises a liquid retention medium for retaining the liquid aerosol-forming substrate, the liquid retention medium being spaced apart in the longitudinal direction from the heat diffuser.

With this arrangement, conductive heat transfer between the heat diffuser and the liquid retention medium may be reduced. This may further mitigate or prevent areas of local high temperature, or "hot spots", from occurring in the liquid retention medium that may otherwise be caused by conductive heating.

Aerosol-generating articles according to the present invention may further comprise a support element may be located immediately downstream of the aerosol-forming substrate (e.g., between the aerosol-forming substrate and the outlet end) or, where the article comprises a liquid retention medium for retaining a liquid aerosol-forming substrate, immediately downstream of the liquid retention medium (e.g., between the liquid retention medium and the outlet end). The support element may abut the aerosol-forming substrate or the liquid retention medium.

The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In some example embodiments, the support element is formed from cellulose acetate. The support element may comprise a hollow tubular element. For example, the support element comprises a hollow cellulose acetate tube. The support element may have an external diameter that is approximately equal to the external diameter of the aerosol-generating article.

The support element may have an external diameter of between approximately 5 millimeters and approximately 12 millimeters, for example of between approximately 5 millimeters and approximately 10 millimeters or of between approximately 6 millimeters and approximately 8 millimeters. For example, the support element may have an external diameter of 7.2 millimeters+/−10 percent.

The support element may have a length of between approximately 5 millimeters and approximately 15 mm. In some example embodiments, the support element has a length of approximately 8 millimeters.

An aerosol-cooling element may be located downstream of the aerosol-forming substrate (e.g., between the aerosol-forming substrate and the outlet end), for example an aerosol-cooling element may be located immediately downstream of a support element, and may abut the support element. The aerosol-cooling element may be located immediately downstream of the aerosol-forming substrate or, where the article comprises a liquid retention medium for retaining a liquid aerosol-forming substrate, immediately downstream of the liquid retention medium. For example, the aerosol-cooling element may abut the aerosol-forming substrate or the liquid retention medium.

The aerosol-cooling element may have a total surface area of between approximately 300 square millimeters per millimeter length and approximately 1000 square millimeters per millimeter length. In some example embodiments, the aerosol-cooling element has a total surface area of approximately 500 square millimeters per millimeter length.

The aerosol-cooling element may have a low resistance to draw. That is, the aerosol-cooling element may offer a low resistance to the passage of air through the aerosol-generating article. The aerosol-cooling element may not substantially affect the resistance to draw of the aerosol-generating article.

The aerosol-cooling element may comprise a plurality of longitudinally extending channels. The plurality of longitudinally extending channels may be defined by a sheet material that has been one or more of crimped, pleated, gathered and folded to form the channels. The plurality of longitudinally extending channels may be defined by a single sheet that has been one or more of crimped, pleated, gathered and folded to form multiple channels. In some example embodiments, the plurality of longitudinally extending channels may be defined by multiple sheets that have been one or more of crimped, pleated, gathered and folded to form multiple channels.

In some example embodiments, the aerosol-cooling element may comprise a gathered sheet of material selected from the group consisting of metallic foil, polymeric material, and substantially non-porous paper or cardboard. In some example embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminum foil.

In some example embodiments, the aerosol-cooling element comprises a gathered sheet of biodegradable material. For example, a gathered sheet of non-porous paper or a gathered sheet of biodegradable polymeric material, such as polylactic acid or a grade of Mater-Bi® (a commercially available family of starch based copolyesters). In some example embodiments, the aerosol-cooling element comprises a gathered sheet of polylactic acid.

The aerosol-cooling element may be formed from a gathered sheet of material having a specific surface area of between approximately 10 square millimeters per milligram and approximately 100 square millimeters per milligram weight. In some example embodiments, the aerosol-cooling element may be formed from a gathered sheet of material having a specific surface area of approximately 35 $mm^2$/mg.

The aerosol-generating article may comprise an outlet piece located at the outlet end of the aerosol-generating article. The outlet piece may be located immediately downstream of an aerosol-cooling element and may abut the aerosol-cooling element. The outlet piece may be located immediately downstream of the aerosol-forming substrate or, where the article comprises a liquid retention medium for retaining a liquid aerosol-forming substrate, immediately downstream of the liquid retention medium. In such embodiments, the outlet piece may abut the aerosol-forming substrate, or the liquid retention medium. The outlet piece may comprise a filter. The filter may be formed from one or more suitable filtration materials. Many such filtration materials are known in the art. In some example embodiments, the outlet piece may comprise a filter formed from cellulose acetate tow.

The outlet piece may have an external diameter that is approximately equal to the external diameter of the aerosol-generating article. The outlet piece may have an external diameter of a diameter of between approximately 5 millimeters and approximately 10 millimeters, for example of between approximately 6 millimeters and approximately 8 millimeters. In some example embodiments, the outlet piece has an external diameter of 7.2 millimeters+/−10%.

The outlet piece may have a length of between approximately 5 millimeters and approximately 20 millimeters. For example, the outlet piece may have a length of from about 7 mm to about 12 mm.

The elements of the aerosol-forming article may be circumscribed by an outer wrapper, for example in the form of a rod. The wrapper may circumscribe at least a downstream portion of the heat diffuser. In some example embodiments, the wrapper circumscribes the heat diffuser along substantially the entire length of the heat diffuser. The outer wrapper may be formed from any suitable material or combination of materials. The outer wrapper may be non-porous.

The aerosol-generating article may be substantially cylindrical in shape. The aerosol-generating article may be substantially elongate. The aerosol-generating article may have a length and a circumference substantially perpendicular to the length. The aerosol-forming substrate or a porous carrier material in which the aerosol-forming substrate is absorbed during use (e.g., the porous carrier material may be configured to absorb the liquid aerosol-forming substrate, based on the frangible capsule being broken), may be substantially cylindrical in shape. The aerosol-forming substrate or the porous carrier material may be substantially elongate. The aerosol-forming substrate, or the porous carrier material, may also have a length and a circumference substantially perpendicular to the length.

The aerosol-generating article may have an external diameter of between approximately 5 millimeters and approximately 12 millimeters, for example of between approximately 6 millimeters and approximately 8 millimeters. In some example embodiments, the aerosol-generating article has an external diameter of 7.2 millimeters+/−10 percent.

The aerosol-generating article may have a total length between approximately 30 mm and approximately 100 mm. In some example embodiments, the aerosol-generating article has a total length of approximately 45 mm.

The aerosol-forming substrate or, where applicable, the liquid retention medium, may have a length of between about 7 mm and about 15 mm. In some example embodiments, the aerosol-forming substrate, or the liquid retention medium, may have a length of approximately 10 mm. In some example embodiments, the aerosol-forming substrate, or the liquid retention medium, may have a length of approximately 12 mm.

The aerosol-generating substrate or liquid retention medium, may have an external diameter that is approximately equal to the external diameter of the aerosol-generating article. The external diameter of the aerosol-forming substrate, or the liquid retention medium, may be between approximately 5 mm and approximately 12 mm. In some example embodiments, the aerosol-forming substrate, or the liquid retention medium, may have an external diameter of approximately 7.2 mm+/−10 percent.

In use, the heat diffuser may heat air drawn through it to between 200 and 220 degrees Celsius. The air may cool to about 100 degrees in the aerosol cooling element.

According to some example embodiments, a heated aerosol-generating system may comprise an electrically operated aerosol-generating device and a heated aerosol-generating article according to any of the example embodiments discussed above.

As used herein, the term 'aerosol-generating device' relates to a device that interacts with an aerosol-forming substrate to generate an aerosol. An electrically operated aerosol-generating device is a device comprising one or more elements used to supply energy from an electrical power supply to an aerosol-forming substrate to generate an aerosol.

An aerosol-generating device may be described as a heated aerosol-generating device, which is an aerosol-generating device comprising a heating element. The heating element or heater is used to heat an aerosol-forming substrate of an aerosol-generating article to generate an aerosol, or the solvent-evolving substrate of a cleaning consumable to form a cleaning solvent.

An aerosol-generating device may be an electrically heated aerosol-generating device, which is an aerosol-generating device comprising a heating element that is operated by electrical power to heat an aerosol-forming substrate of an aerosol-generating article to generate an aerosol.

The aerosol-generating device of the aerosol-generating system may comprise: a housing having ("defining") a cavity for receiving ("configured to receive") the aerosol-generating article and a controller configured to control the supply of power from a power supply to an electric heating element of the system.

The electric heating element may form part of the aerosol-generating article, part of the aerosol-generating device, or both.

In some example embodiments, the electric heating element forms part of the device.

The electric heating element may comprise one or more heating elements.

In some example embodiments, the electrically operated aerosol-generating device comprises an electric heating element and a housing having a cavity, and the heated aerosol-generating article is received in the cavity such that the heat diffuser is penetrated by the electric heating element. The heating element may conveniently be shaped as a needle, pin, rod, or blade that may be inserted into the heat diffuser.

Aerosol-generating systems according to some example embodiments include an electric heating element. The electric heating element may comprise one or more external heating elements, one or more internal heating elements, or one or more external heating elements and one or more internal heating elements. As used herein, the term "external heating element" refers to a heating element that is positioned outside of the heat diffuser when an aerosol-generating system comprising the heat diffuser is assembled. As used herein, the term "internal heating element" refers to a heating element that is positioned at least partially within the heat diffuser when an aerosol-generating system comprising the heat diffuser is assembled.

The one or more external heating elements may comprise an array of external heating elements arranged around the inner surface of the cavity. In certain examples, the external heating elements extend along the longitudinal direction of the cavity. With this arrangement, the heating elements may extend along the same direction in which the article is inserted into and removed from the cavity. This may reduce interference between the heating elements and the heat diffuser relative to devices in which the heating elements are not aligned with the length of the cavity. In some example embodiments, the external heating elements extend along the length direction of the cavity and are spaced apart in the circumferential direction. Where the heating element comprises one or more internal heating elements, the one or more internal heating elements may comprise any suitable number of heating elements. For example, the heating element may comprise a single internal heating element. The single internal heating element may extend along the longitudinal direction of the cavity.

The electric heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminum- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, TIMETAL®, iron-aluminum based alloys and iron-manganese-aluminum based alloys. TIMETAL® is a registered trade mark of Titanium Metals Corporation, 1999 Broadway Suite 4300, Denver Colorado. In composite materials, the electrically resistive material may optionally be embedded in, encapsulated or coated with an insulating material or vice-versa, depending on the kinetics of energy transfer and the external physicochemical properties associated therewith. The heating element may comprise a metallic etched foil insulated between two layers of an inert material. In that case, the inert material may comprise KAPTON®, all-polyimide or mica foil. KAPTON® is a registered trade mark of E.I. du Pont de Nemours and Company, 1007 Market Street, Wilmington, Delaware 19898, United States of America.

Where the electric heating element comprises a susceptor in thermal contact with the porous body of the heat diffuser, the aerosol-generating device may comprise an inductor arranged to generate a fluctuating electromagnetic field within the cavity. The aerosol-generating device may include an electrical power supply connected to the inductor. The inductor may comprise one or more coils that generate a fluctuating electromagnetic field. The coil or coils may surround the cavity.

The device may be capable of generating a fluctuating electromagnetic field of between 1 and 30 MHz, for example, between 2 and 10 MHz, for example between 5 and 7 MHz. The device may be capable of generating a fluctuating electromagnetic field having a field strength (H-field) of between 1 and 5 kA/m, for example between 2 and 3 kA/m, for example about 2.5 kA/m.

The aerosol-generating device may be a portable or handheld aerosol-generating device that is comfortable to hold between the fingers of a single hand.

The aerosol-generating device may be substantially cylindrical in shape.

The aerosol-generating device may have a length of between approximately 70 millimeters and approximately 120 millimeters.

The device may comprise a power supply for supplying electrical power to the electric heating element. The power supply may be any suitable power supply, for example a DC voltage source such as a battery. In some example embodiments, the power supply is a Lithium-ion battery. In some example embodiments, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The controller may be a simple switch. The controller may be electric circuitry and may comprise one or more microprocessors or microcontrollers.

As used herein, the terms 'upstream' and 'downstream' are used to describe the relative positions of elements, or portions of elements, of the aerosol-generating article, or aerosol-generating device, in relation to the direction in which air is drawn through the system during use thereof. "Upstream" and "downstream" may also be used to describe the relative positions of elements, or portions of elements, of the aerosol-generating article, or aerosol-generating device, in relation to the outlet end and/or distal end of the aerosol-generating article or the aerosol-generating device.

As used herein, the term 'longitudinal' is used to describe the direction between the upstream end and the downstream end of the aerosol-generating article, or an element thereof, or the aerosol-generating device, and the term 'transverse' is used to describe the direction perpendicular to the longitudinal direction.

As used herein, the term 'diameter' is used to describe the maximum dimension in the transverse direction of the aerosol-generating article, or an element thereof, or the aerosol-generating device. As used herein, the term 'length' is used to describe the maximum dimension in the longitudinal direction.

As used herein, the term 'removably coupled' is used to mean that the article and device can be coupled and uncoupled from one another without significantly damaging either element. For example, the article may be removed from the device when the aerosol-forming substrate has been consumed.

Features described in relation to one or more aspects may equally be applied to various example embodiments. In particular, features described in relation to the article of the first aspect may be equally applied to the system of the second aspect, and vice versa.

FIG. 1 illustrates an aerosol-generating article 100 according to some example embodiments. The aerosol-generating article 100 comprises four elements arranged in coaxial alignment: a heat diffuser 110, a tubular liquid retention medium 120, an aerosol-cooling element 130, and an outlet piece 140. Each of these four elements is a substantially cylindrical element, each having substantially the same diameter. These four elements are arranged sequentially and are circumscribed by a non-porous outer wrapper 150 to form a cylindrical rod.

The aerosol-generating article 100 has a distal or upstream end 160 and a proximal or outlet end 170, opposite to the upstream end 160, through which vapor and/or air may be drawn during use of the aerosol-generating article 100. Once assembled, the total length of the aerosol-generating article 100 is about 33 mm about 45 mm and the diameter is about 7.2 mm.

The heat diffuser 110 is located at the extreme distal or upstream end 160 of the aerosol-generating article 100 includes a porous body 112 in the form of a cylindrical plug of heat storage material. The porous body 112 has a cavity in the form of a slot 114 in its upstream end, which is arranged to ("configured to") receive a blade-shaped heating element, as discussed below in relation to FIG. 2. The pores in the porous body 112 are interconnected to form a plurality of air flow passages extending through the porous body 112 from its upstream end to its downstream end.

The tubular liquid retention medium 120 is located downstream of the heat diffuser 110 (e.g., between the heat diffuser and the outlet end of the aerosol-generating article 100) and is spaced apart from the heat diffuser 110 in the longitudinal direction of the article 100 by a separation 105. This may reduce or minimize the extent to which the liquid retention medium 120 might be heated by conduction from the heat diffuser 110.

The article 100 further includes a frangible capsule 122 located within the lumen 124 of the liquid retention medium 120. The frangible capsule 122 contains a liquid aerosol-forming substrate 126.

The tubular liquid retention medium 120 has a length of 8 mm and is formed from fibrous cellulose acetate material. The liquid retention medium has a capacity to absorb 35 microliters of liquid. The lumen 124 of the tubular liquid retention medium 120 provides an air flow path through the liquid retention medium 120 and also acts to locate the frangible capsule 122. The material of the liquid retention medium may be any other suitable fibrous or porous material.

The frangible capsule 122 is shaped as an oval spheroid and has the long dimension of the oval aligned with the axis of the lumen 124. The oval spheroid shape of the capsule may mean that it is easier to break than if it was circular spherical in shape, but other shapes of capsule may be used. The capsule 122 has an outer shell comprising a gelatin based polymeric material surrounding a liquid aerosol-forming substrate.

The liquid aerosol-forming substrate 126 comprises propylene glycol, nicotine extract, and 20 weight percent water. A wide range of flavorants may be optionally added. A wide range of aerosol-formers may be used as an alternative to, or in addition to, propylene glycol. The capsule is about 4 mm in length and contains a volume of about 33 microliters of liquid aerosol-forming substrate.

The aerosol-cooling element 130 is located immediately downstream of and abuts the liquid retention medium 120. In use, volatile substances released from the aerosol-forming substrate 126 pass along the aerosol-cooling element 130 towards the outlet end 170 of the aerosol-generating article 100. The volatile substances may cool within the aerosol-cooling element 130 to form an aerosol that is drawn through the outlet end 170. In the example embodiments illustrated in FIG. 1, the aerosol-cooling element 130 comprises a crimped and gathered sheet 132 of polylactic acid circumscribed by a wrapper 134. The crimped and gathered sheet 132 of polylactic acid defines a plurality of longitudinal channels that extend along the length of the aerosol-cooling element 130.

The outlet piece 140 is located immediately downstream of and abuts the aerosol-cooling element 130. In the example embodiments illustrated in FIG. 1, the outlet piece 140 comprises a cellulose acetate tow filter 142 of low filtration efficiency.

To assemble the aerosol-generating article 100, the four cylindrical elements described above are aligned and tightly wrapped within the outer wrapper 150. In the example embodiments illustrated in FIG. 1, the outer wrapper 150 is formed from a non-porous sheet material. In other examples, the outer wrapper may comprise a porous material, such as cigarette paper.

Figure 2:
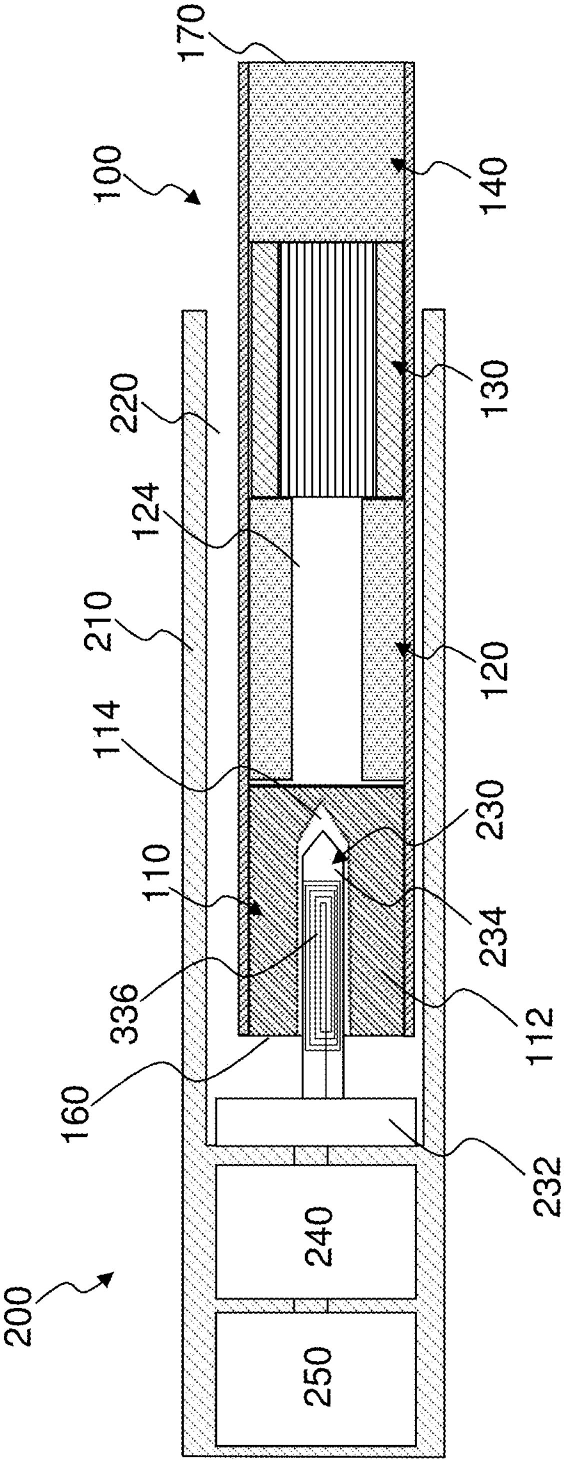
FIG. 2 shows a schematic view of an aerosol-generating system according to some example embodiments, the system comprising the aerosol-generating article of FIG. 1.

FIG. 2 shows an aerosol-generating system in accordance with some example embodiments. The aerosol-generating system comprises the aerosol-generating article 100, and an aerosol-generating device 200.

The aerosol-generating device 200 includes a housing 210 defining a cavity 220 for receiving the aerosol-generating article 100. The device 200 further includes a heater 230 comprising a base portion 232 and a heating element in the form of a heater blade 234 that penetrates the heat diffuser 110 so that a portion of the heater blade 234 extends into the slot in the porous body 112 when the article 100 is received in the cavity 220, as shown in FIG. 2. The heater blade 234 comprises resistive heating tracks 236 for resistively heating (e.g., configured to resistively heat) the heat diffuser 110. A controller 240 controls the operation of the device 200, including the supply of electrical current from a battery 250 to the resistive heating tracks 236 of the heater blade 234. The controller 240 may include at least one instance of processing circuitry, also referred to herein as a processor (e.g., a central processing unit or "CPU," an application-specific integrated circuit or "ASIC," some combination thereof, or the like) and a memory device ("storage device"). The memory may store a program of instructions, and the processing circuitry may execute the stored program of instructions to control the operation of the device 200.

In the example embodiments shown in FIG. 2, the frangible capsule has been ruptured prior to insertion of the article 100 into the cavity 220 of the device 200. Thus, the liquid aerosol-forming substrate is shown as having been absorbed into the liquid retention medium 120.

During use, the controller 240 supplies electrical current from the battery 250 to the resistive heating tracks 236 to heat the heater blade 234. Thermal energy is then absorbed by the porous body 112 of the heat diffuser 110. Restated the heat diffuser may be configured to absorb heat. Air is drawn into the device 200 through air inlets (not shown) and subsequently through the heat diffuser 110 and along the aerosol-generating article 100 from the distal end 160 to the outlet end 170 of the aerosol-generating article 100. As air is drawn through the porous body 112, the air is heated by the heat stored in the porous body 112 before passing through the tubular liquid retention medium 120 to heat the liquid aerosol-forming substrate in the liquid retention medium 120. Restated, the porous body 112 may be configured to absorb heat, such that the heat diffuser 110 is configured to heat air drawn through the device 200 from the distal end to the outlet end thereof. The air may be heated by the heat diffuser to between 200 and 220 degrees Celsius. The air may the cool to about 100 degrees as it is drawn through the aerosol cooling element.

During the heating cycle, at least some of the one or more volatile compounds within the aerosol-generating substrate are evaporated. The vaporized aerosol-forming substrate is entrained in the air flowing through the liquid retention medium 120 and condenses within the aerosol-cooling element 130 and the outlet piece portion 140 to form an aerosol, which exits the aerosol-generating article 100 at its outlet end 170.

Figure 3:
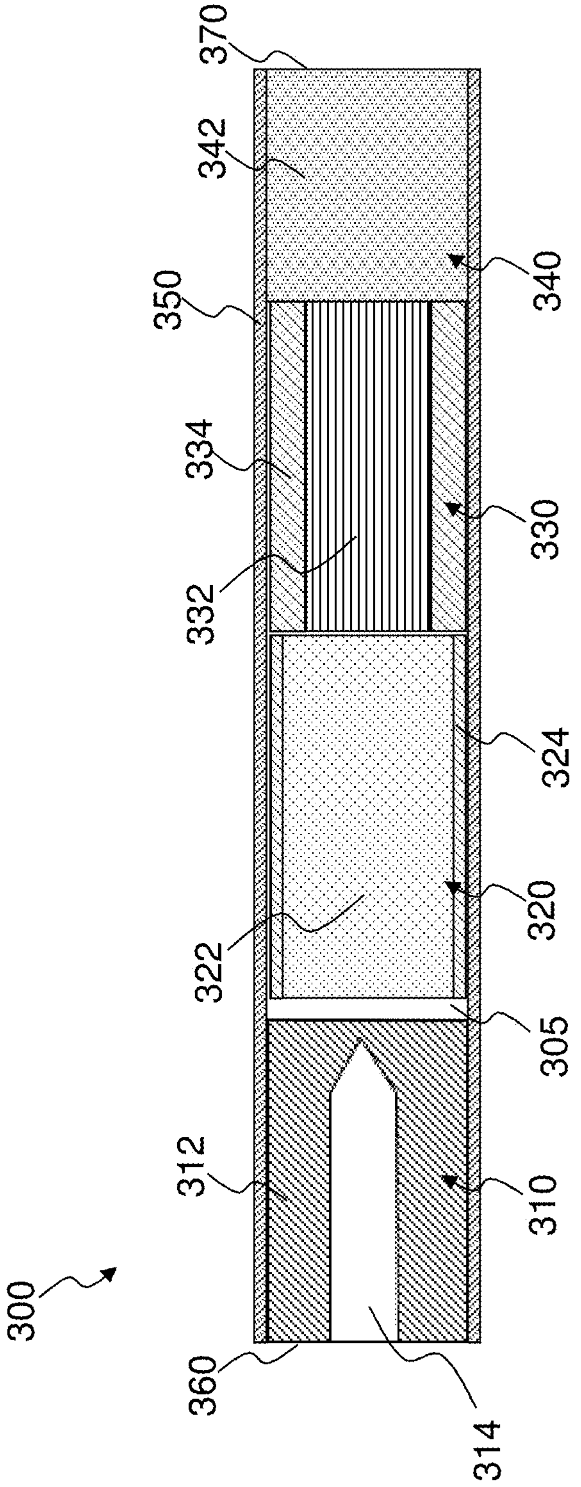
FIG. 3 shows a schematic longitudinal cross-section of an aerosol-generating article according to some example embodiments.

FIG. 3 shows an aerosol-generating article 300 according to a second aspect of the present invention. The aerosol-generating article 300 has a similar structure to the aerosol-generating article 100 of FIG. 1 and where the same features are present like reference numerals have been used. As with the aerosol-generating article 100 of FIG. 1, the aerosol-generating article 300 comprises a heat diffuser 310, an aerosol-cooling element 330, and an outlet piece 340 arranged in coaxial alignment and circumscribed by a non-porous outer wrapper 350 to form a cylindrical rod: However, unlike the generating article 100 of FIG. 1, the aerosol-generating article 300 includes a solid aerosol-forming substrate in the form of a cylindrical plug 320 of homogenized tobacco-based material 322 including an aerosol former such as, for example, glycerine, wrapped in plug wrap 324. As with the liquid retention tube of the first article 100, the aerosol-forming substrate plug 320 is positioned downstream of the heat diffuser 310 and upstream of the aerosol-cooling element 330 and is circumscribed by the wrapper 350. During use, air is drawn through the heat diffuser 310 and the aerosol-forming substrate plug 320. Use of the aerosol-generating article 300 is otherwise the same as discussed above in relation to FIGS. 1 and 2.

The example embodiments and examples described above illustrate but do not limit the example embodiments. It is to be understood that the example embodiments and examples described herein are not exhaustive.

For example, although the example embodiments shown in FIGS. 1 and 2 illustrate that the article 100 includes one frangible capsule, in some example embodiments, two or more frangible capsules may be provided.

Furthermore, although the example embodiments shown in FIG. 2 illustrate the heating element as a heating blade arranged to extend into the heat diffuser, the heating element may be provided as one or more heating elements extending around the periphery of the cavity. Additionally or alternatively, the heating element may comprise a susceptor located within the heat diffuser. For example, a blade-shaped susceptor may be located within the heat diffuser, in contact with the porous body. One or both ends of the susceptor may be sharpened or pointed to facilitate insertion into the heat diffuser.

The invention claimed is:

1. A heated aerosol-generating system, comprising:

an electric heating element configured to generate heat; and an article with a heat diffuser on a distal end of the article, the heat diffuser including a porous body that is non-combustible and is configured to absorb the heat, such that the heat diffuser is configured to heat air drawn through the heated aerosol-generating system, based on absorbing the heat generated by the electric heating element, the porous body defining a cavity that is configured to receive the electric heating element, a portion of the porous body being between the cavity and an outlet end of the article along a longitudinal length of the article.

2. The heated aerosol-generating system according to claim 1, wherein the porous body comprises a heat storage material.

3. The heated aerosol-generating system of claim 2, wherein the porous body at least partially comprises a material having a specific heat capacity, at a temperature of 25 degrees Celsius, of at least 0.5 J/gK, 0.7 J/gK, and/or 0.8 J/gK.

4. The heated aerosol-generating system according to claim 2, wherein the porous body at least partially comprises a material of glass fiber, glass mat, ceramic, silica, alumina, carbon, and/or a mineral.

5. The heated aerosol-generating system according to claim 1, wherein the porous body is thermally conductive.

6. The heated aerosol-generating system of claim 5, wherein the porous body at least partially comprises a material having a thermal conductivity, at a temperature of 23 degrees Celsius and a relative humidity of 50%, of at least 40 W/mK, 100 W/mK, 150 W/mK, and/or 200 W/mK.

7. The heated aerosol-generating system of claim 5, wherein the porous body at least partially comprises a thermally conductive material of aluminum, copper, zinc, steel, silver, and/or a thermally conductive polymer.

8. The heated aerosol-generating system according to claim 1, wherein the porous body defines a cavity penetrated by the electric heating element.

9. The heated aerosol-generating system according to claim 1, wherein the electric heating element comprises a susceptor embedded in the porous body.

10. The heated aerosol-generating system according to claim 9, wherein the susceptor is blade-shaped.

11. The heated aerosol-generating system according to claim 1, wherein the electric heating element is a shape selected from the group consisting of a needle, a pin, a rod, and a blade.

12. The heated aerosol-generating system according to claim 11, wherein the porous body is pierced by the electric heating element.

* * * * *